United States Patent
Arnulfi et al.

(10) Patent No.: US 6,412,509 B1
(45) Date of Patent: Jul. 2, 2002

(54) PASSIVE SURGE CONTROL METHOD FOR COMPRESSION SYSTEMS AND RELATIVE DEVICE

(75) Inventors: Gianmario Arnulfi, Udine; Pietro Giannattasio, Pagnacco; Piero Pinamonti; Diego Micheli, both of Trieste, all of (IT)

(73) Assignee: Universitá Degli Studi di Udine, Udine (IT)

( * ) Notice: Subject to any disclaimer, the term of this patent is extended or adjusted under 35 U.S.C. 154(b) by 0 days.

(21) Appl. No.: 09/680,083

(22) Filed: Oct. 5, 2000

(30) Foreign Application Priority Data

Oct. 8, 1999 (IT) .......................................... UD99A0181

(51) Int. Cl.[7] .................................................. F16L 55/04
(52) U.S. Cl. ....................... 137/1; 137/565.34; 137/593; 138/26
(58) Field of Search ............................ 137/565.34, 593, 137/1; 138/26

(56) References Cited

U.S. PATENT DOCUMENTS

| | | | |
|---|---|---|---|
| 1,767,100 A | * 6/1930 | Tannehill | ................... 138/26 X |
| 2,100,404 A | * 11/1937 | Mason et al. | .............. 138/26 X |
| 2,124,551 A | * 7/1938 | Freidman et al. | .......... 138/26 X |
| 2,158,985 A | * 5/1939 | Peet | ........................ 137/593 X |
| 3,169,551 A | * 2/1965 | Lewis | ........................... 138/26 |
| 3,201,942 A | * 8/1965 | Yamamoto | ............... 137/593 X |
| 4,177,023 A | 12/1979 | Kamiya et al. | |
| 4,648,577 A | 3/1987 | Weber | |
| 5,064,360 A | * 11/1991 | Blum | ................. 137/565.34 X |
| 5,199,856 A | * 4/1993 | Epstein et al. | ....... 137/565.34 X |

FOREIGN PATENT DOCUMENTS

| | | |
|---|---|---|
| JP | 62 292943 | 12/1987 |
| JP | 01 238728 | 9/1989 |

* cited by examiner

Primary Examiner—John Rivell
(74) Attorney, Agent, or Firm—Akin, Gump, Strauss, Hauer & Feld, L.L.P.

(57) ABSTRACT

Passive surge control method and device for a compression system, used to reduce the functioning instability created in particular operating conditions, wherein the compression system consists of a compressor element (12) and a plenum (13) defined by at least an inner volume (16) containing a column of liquid (21) communicating with a volume of liquid (21) through at least an aperture (22, 24, 27) in order to absorb and dissipate the non-stationary energy associated with the oscillations generated inside the plenum (13).

23 Claims, 3 Drawing Sheets

PASSIVE SURGE CONTROL METHOD FOR COMPRESSION SYSTEMS AND RELATIVE DEVICE

FIELD OF THE INVENTION

This invention concerns a passive surge control method for compression systems, and the relative device, able to reduce or eliminate the instabilities which are created in particular operating conditions.

The invention is applied particularly in the control of industrial turbo-compressors of an axial or centrifugal type.

BACKGROUND OF THE INVENTION

In the field of compression systems, it is well-known that the operating field, in terms of pressure-flow of the operating fluid, is limited by phenomena of low frequency dynamic instability which occur under certain conditions.

It is well-known that for low values of fluid flow and high values of fluid pressure there is a zone of fluid dynamic instability, called surge zone, wherein the operating condition of the system becomes unacceptable, as it may entail considerable reductions in productivity and performance of the compressor, and also structural damage to the plant.

Working in the surge zone may also be extremely dangerous and unacceptable, for example in the case of gas turbines for use in aeronautics. In certain cases, the instability may also be associated with a flow-back of the fluid towards the compressor.

To overcome this problem, the most common practice has generally been to keep the operating point of the system sufficiently far from the limit defined as the so-called "surge line".

Automatic systems have therefore been provided which activate a control member, for example a breather valve, when it is found that the system is approaching the surge line to an extent considered dangerous.

These systems, however, negatively affect the efficiency and performance of the system in that they do not allow it to function in zones which are near the surge line but outside the instability zone, where the maximum values of performance and pressure gap are found.

Therefore, more recently, control systems have been proposed which are able to modify the dynamic behaviour of the compression system in order to effectively amplify the stable operating field of the system and to allow, within certain limits, to reduce the amplitude of the surge zone wherein the system is prevented from working.

A first type consists of active instability control systems, which use a sensor suitable to monitor the value of a representative parameter of the state of the system (pressure, flow, or otherwise) and an actuator able to intervene in feedback in a closed loop pattern.

Although they are valid in most cases, such systems, of the type with a control logic outside the system, have the disadvantage that, in some situations, their flexibility is reduced and their capacity to adapt to all operating situations is limited.

As an alternative to active control systems, passive control systems have been proposed; these consist of a device of the mass-spring-damper type coupled in an aeroelastic manner with the compression plant and suitable to react in an intrinsic and adaptive fashion to the stresses which tend to take the system into conditions of instability.

With this approach, it is the structural feedback of the system which reacts to the causes of instability, rather than an outside controller which acts according to a predetermined command logic.

However, since this system has to be able to absorb low frequency oscillations, the elasticity constant of the spring consequently has to be very low and therefore not compatible with conventional elastic elements of a mechanical type.

Therefore, in various documents it has been proposed to use a volume of gas as an elastic element. One such device, described in the article "Dynamic Control of Centrifugal Compressor Surge Using Tailored Structures" by D. L. Gysling et al., taken from Transactions of the ASME, October 1991, vol. 113, pages 710–722, provides to place an auxiliary chamber (auxiliary plenum) in contact with the main chamber (plenum) of the compression plant.

The two plenums are separated by a movable wall, which functions as the mass, constrained to an element which functions as a damper, and the movement of the movable wall is conditioned by a volume of gas in the auxiliary plenum which functions as a spring.

With this system, the low-frequency oscillatory disturbance which is generated in the main plenum and which leads to instability of the system is absorbed and dissipated thanks to the elastic movement of the movable wall and the damper connected thereto.

This system has been tried successfully on a small centrifugal compressor and has shown its efficiency and operating validity.

However, when this teaching is transferred to studies on applications of greater dimensions, more interesting and more common from an industrial point of view, it has been found that to ensure an efficacious control the volume of the auxiliary plenum has to assume excessive dimensions, absolutely incompatible with the constraints imposed by any industrial plant.

Therefore, even if the solution proposed appears valid and interesting from a theoretical point of view, in practical application it has numerous limits and is therefore inapplicable in most cases.

The present Applicant has tried and embodied this invention to solve the problems concerning passive control systems for compression plants, and to obtain further advantages as shown hereinafter.

SUMMARY OF THE INVENTION

The invention is set forth and characterized in the respective main claims, while the dependent claims describe other characteristics of the main embodiment.

The purpose of the invention is to achieve a method, and the relative devices, to carry out a passive control of the operating instabilities which occur in compression plants and systems, able to be applied substantially to every type of industrial plant with limited costs and with considerable operating efficiency and flexibility.

The method according to the invention provides to couple the compression system with an elastic system based on a column of liquid oscillating under the action of gravity and a suitable damper device.

To be more exact, the method according to the invention provides to use a liquid column whose surface (meniscus) is arranged in contact, either directly or indirectly, with the inner volume of the plenum of the compression system.

The liquid column communicates, through a suitable aperture or throttle, with a liquid volume whose meniscus is subject to a desired pressure, for example, atmospheric pressure.

With this embodiment, we obtain a self-adapting passive control system wherein the mass of liquid constitutes the inert element, the force of gravity determines the elastic return action and the connection aperture functions as a damper able to dissipate the oscillations which are generated in the plenum of the compression system under conditions of instability.

In fact, these oscillations determine a dynamic reply in the liquid column which is associated with the absorption of the non-stationary energy possessed by said oscillations and allows them to be dissipated through a suitable damper element. In this way, the instability can be eliminated.

When a condition of stability has been restored, the level of the two meniscuses of the two communicating liquid columns differs due to the head corresponding to the differential pressure.

The correct application of this device is conditioned by the suitable choices of the operating parameters, such as: mass of the liquid, areas of the meniscuses, height of the liquid column and entity of damping.

A device able to achieve the method according to the invention comprises at least a first container of a liquid whose meniscus is in contact with the inner volume of the plenum of the compression system.

In the preferential embodiment of the invention, the device and the plenum are connected by means of a tube connected at one end to the inner volume of the plenum and at the other end to the inner volume of said first container.

This embodiment allows to obtain a sufficiently ample surface at the meniscus, and thus able to efficiently perform the function of compensating the oscillations and instabilities of the plenum without requiring a bulky structure incompatible with the requirements of industrial plants.

Moreover, with this embodiment the volume of the plenum is not increased too much, and therefore no further encouragement is given for instabilities to occur.

The first container is immersed inside a second container, filled with liquid, with which it communicates by means of at least an aperture able to produce a loss of load.

In a possible embodiment, these connection apertures are adjustable in size so as to allow the control system to be set according to the specific requirements and the operating conditions of the compression system to which the control system is applied.

In one embodiment of the invention, the position of the first container inside the relative second container can be adjusted in order to define a specific level of immersion; when this is varied, the characteristics of the control device are varied.

According to another variant, in the case of high working pressures in the compression system, there is a system to reduce the pressure between the volume of the plenum and the meniscus of the liquid column.

This embodiment allows to obtain an efficient action to control the instability of the system without requiring the use of a column of water of an excessive height incompatible with practical applications.

BRIEF DESCRIPTION OF THE DRAWINGS

These and other characteristics of the invention will become clear from the following description of some preferential forms of embodiment, given as a non-restrictive example, with reference to the attached drawings wherein.

DETAILED DESCRIPTION OF PREFERRED EMBODIMENTS

Figure 1:
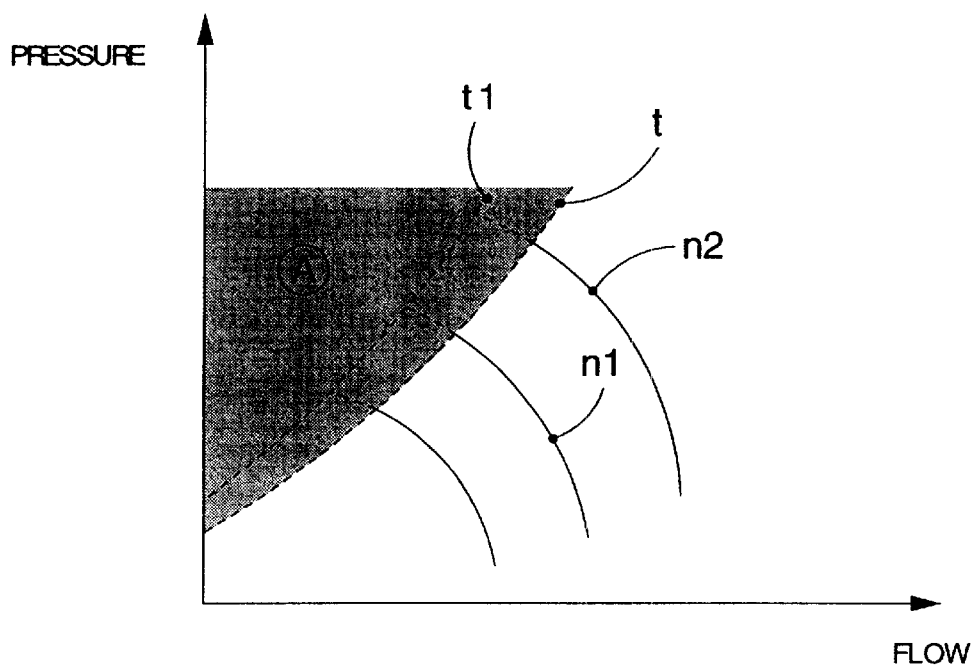
FIG. 1 shows a pressure-flow graph showing the surge zone where the operating instability is created.

FIG. 1 shows a typical pressure-flow graph of an axial or centrifugal turbo-compressor.

The map shows the field and points of functioning of the compression system, as the flow and pressure parameters vary, according to the speed of rotation of the machine.

The curves indicated by "n1" and "n2" define a functioning with a constant speed of rotation.

For particular values of flow and pressure, particularly for low flow values, an area is defined on the map, indicated by the letter "A", which represents the so-called surge zone, in which the functioning of the system may become oscillatory and unstable and may lead to serious problems, damage and break-downs.

The separation line, shown by "t", defines the limit which must not be exceeded in order not to enter into said surge zone "A".

Figure 2:
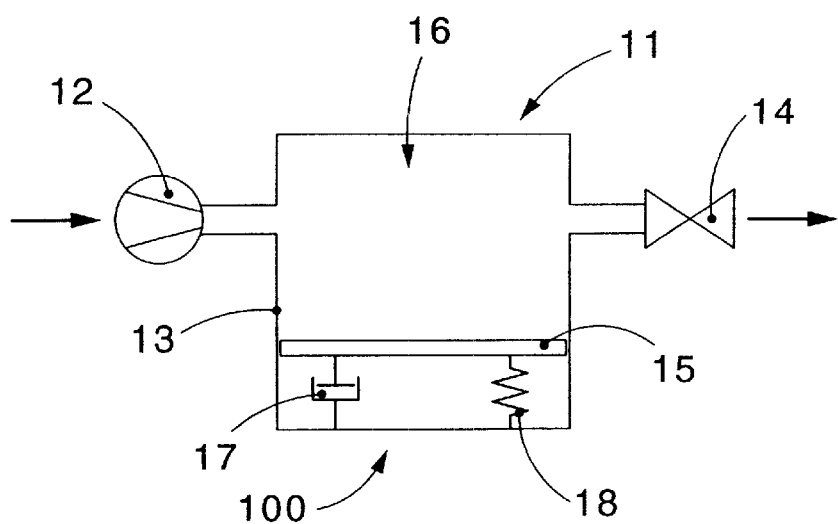
FIG. 2 is a schematic representation of the principle of a passive surge control system for compression systems.

A general diagram of a passive surge control system 100 of the type described above, for a compression system shown in its entirety by the reference number 11, is shown in FIG. 2.

The compression system 11 is shown by the compression element 12, the plenum 13, and the user, for example a discharge valve 14.

To stabilize the system 11 when the point of functioning goes into the surge zone "A", a movable mass 15 is provided, arranged in contact with the inner volume 16 of the plenum 13, equipped with a damper 17 able to dissipate the oscillations which are generated in the plenum 13 and with an elastic element 18 which allows the movable mass 15 to react dynamically to the pressure oscillations in the plenum.

Figure 3:
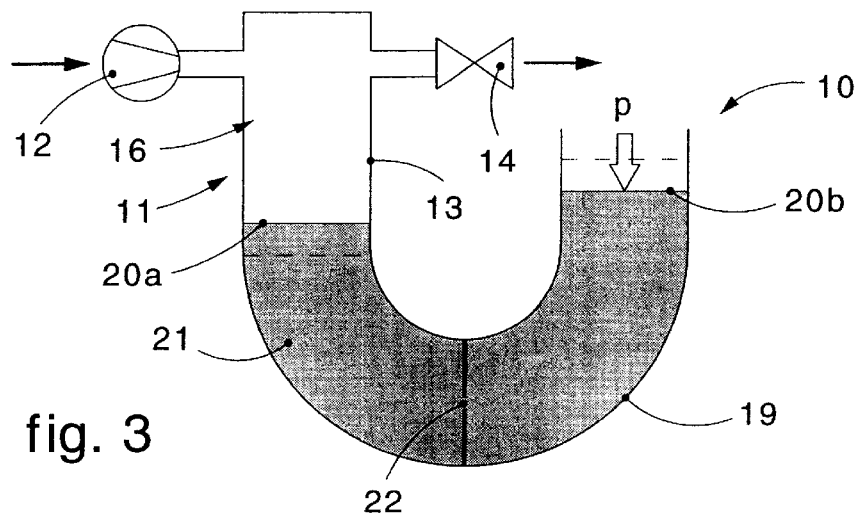
FIG. 3 shows schematically the principle of the passive control system according to the invention.

FIG. 3 shows schematically a device 10 according to the invention able to be applied to a general compression system 11 based on a turbo-compressor to achieve a passive control of the operating instability.

This control allows to reduce and eliminate the surge at points of functioning which are normally unstable; it therefore allows the system to function even in points which are in the zone indicated by "A", and which are normally unusable in non-controlled systems.

To simplify, we can say that this control allows to displace the surge line farther towards the left in the graph shown in FIG. 1, for example to the position "t1", extending the zone of stable functioning to allow the machine to function in zones, near or to the left of the line "t", characterized by high performance and high pressure gap.

The device 10 comprises a tube 19, substantially U-shaped, filled with a desired liquid 21, with a first surface 20a in contact with the inner volume 16 of the plenum 13 of the compression system 11.

The second surface 20b is subjected to a desired pressure "p", normally constant, for example atmospheric pressure.

The two arms of the U-shaped tube are connected by means of a throttle 22.

With joint reference to FIGS. 2 and 3, the liquid 21 functions as the mass 15, the throttle 22 functions as the damper 17, while the force of gravity performs the return action associated with the elastic element 18 shown in FIG.

According to a variant, the throttle 22 is omitted and the damping is obtained simply by the liquid flowing on the walls of the tube or by any other element able to produce a loss of load.

With the device 10, any oscillation occurring in the plenum 13 generates an instantaneous variation in the level of the first surface 20a (shown by a line of dashes in the Figure), with a consequent variation in the level of the second surface 20b due to the connection by means of the throttle 22.

The function of the throttle 22 is to dissipate the non-stationary energy associated with the oscillations and therefore prevents an unstable behaviour from occurring in the compression system.

Figure 4:
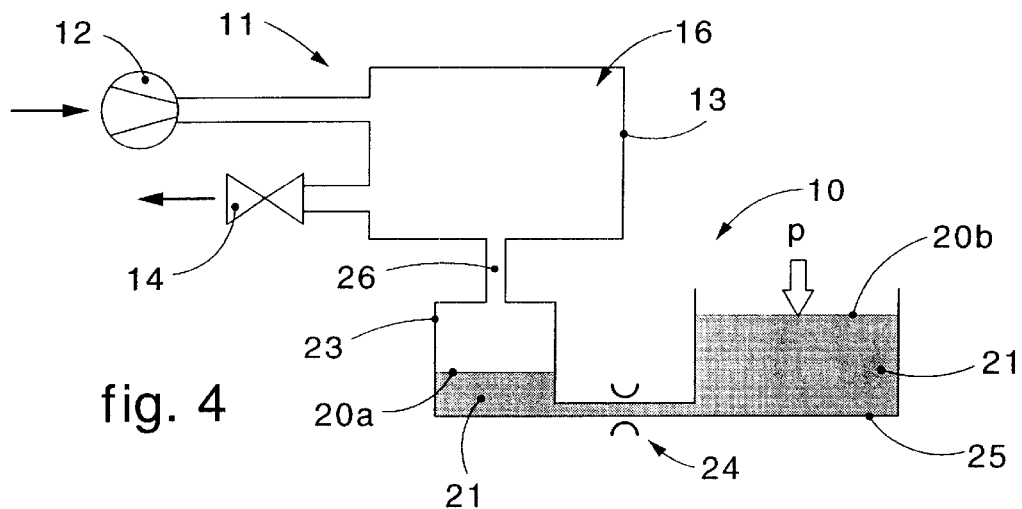
FIG. 4 shows a first embodiment of the passive control device according to the invention.

The device 10 shown in FIG. 4 is suitable to embody the principle of absorbing and dissipating the non-stationary energy as shown schematically in FIG. 3, and comprises a first container 23 partly filled with liquid 21, the surface 20a of which is directly in contact, by means of a conduit 26, with the inner volume 16 of the plenum 13.

The first container 23 communicates with a second container 25, adjacent to the first 23 and partly filled with liquid 21 whose surface 20b is subjected to an atmospheric pressure "p".

In this specific case, the means which allow the first 23 and second 25 containers to communicate consist of valve means 24, advantageously of the type with an adjustable aperture.

In this case too, the function of the variations in the level of the liquid 21 in the two containers 23 and 25 is to absorb the oscillations which have occurred in the plenum 13 and therefore to allow the valve 24 to damp them.

Figure 5:
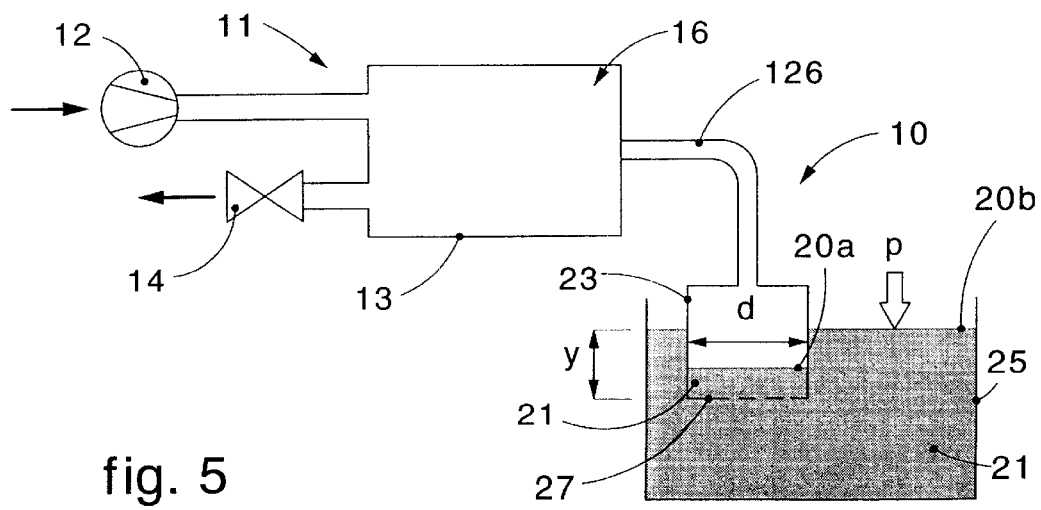
FIG. 5 shows another embodiment of the device according to the invention.

According to the further embodiment shown in FIG. 5, a first container 23 is provided partly filled with liquid 21, immersed to a value equal to "y" in a second container 25 also partly filled with liquid 21.

The inner volume 16 of the plenum 13 and the inside of the first container 23 is connected by means of a conduit 126, in this case elbow-shaped, which allows to contain the overall bulk of the control device 10 by using a container 23 characterized by an adequate section size "d" such as to ensure an ample surface for the meniscus 20a of the liquid 21.

The first container 23 is connected to the second container 25 by means of a plurality of apertures 27, the function of which is to damp the oscillations generated inside the plenum 13.

The apertures 27, according to a possible solution, are equipped with devices to regulate the gap in order to vary the damping conditions of the oscillations.

Figure 6:
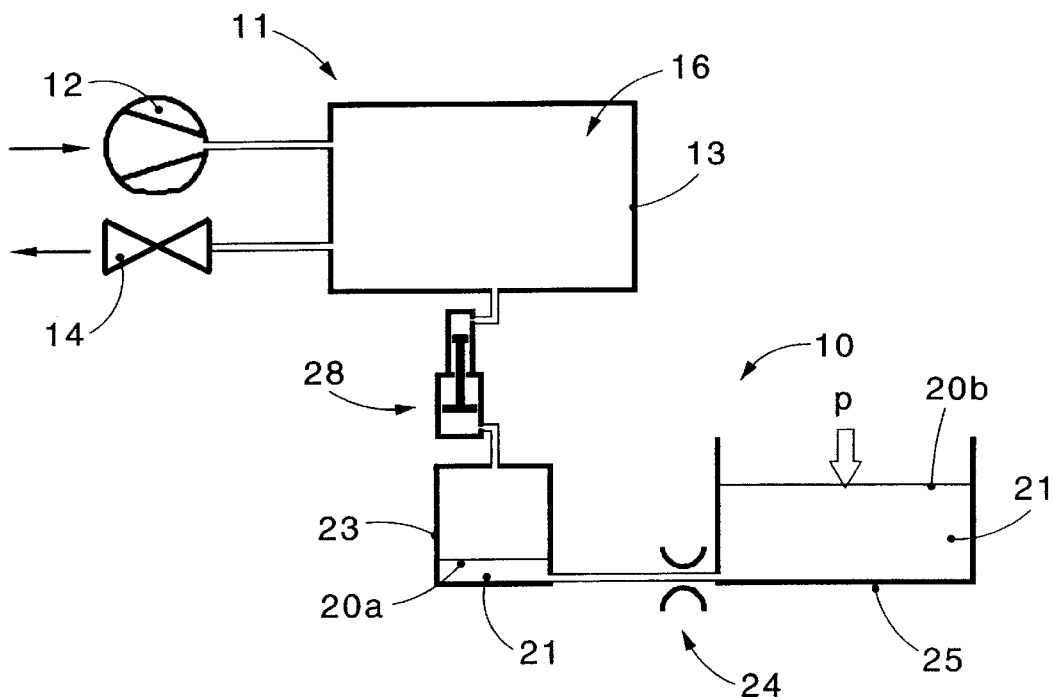
FIG. 6 shows still another embodiment of the device according to the invention.
Figure 7:
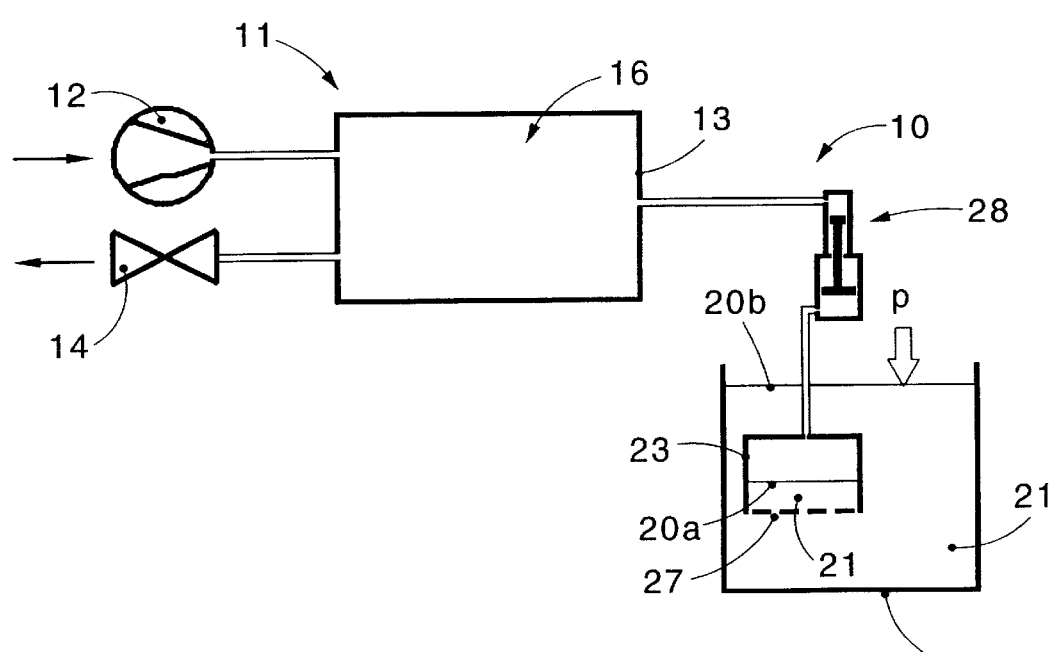
FIG. 7 shows yet another embodiment of the device according to the invention.

Referring to FIGS. 6–7, other variants of the invention, in the case of turbo-compressors where the working pressures can assume very high values, a pressure de-intensifier device 28 is provided between the inner volume 16 and the plenum 13 and the surface 20a of the liquid contained in the first container 23.

The pressure de-intensifier device 28, for example in the form of a differential piston or other suitable device, allows to attenuate the oscillations even when there are very high pressures, without requiring a column of liquid of excessive size, incompatible with the size of an industrial plant.

Modifications and variants may be made to this invention but these shall remain within the field and scope thereof.

For example, it is within the field and scope of the invention to provide that the liquid 21 consists of water or other liquids having characteristics of different density according to the level of response to the oscillations which is to be obtained.

It is also within the field and scope of the invention to provide three or more containers for the liquid 21, communicating with each other, or to provide that the second surface 20b is subjected to a different pressure from atmospheric pressure.

Moreover, it is within the field and scope of the invention to provide to use containers 23 and 25 of a particular shape and designed expressly to obtain specific results in terms of attenuating the oscillations.

What is claimed is:

1. Passive surge control method for reducing an instability of a compression system under particular operating conditions, the method comprising:

operating the compression system under the particular operating conditions producing the instability; and coupling the compression system with an elastic system based on a column of liquid (21) oscillating under an applied force comprising gravity and a damping force of at least a damper device (22, 24, 27).

2. The method according to claim 1, wherein the compression system comprises at least a compression element (12) and a plenum (13) defined by at least an inner volume (16), and wherein the coupling step comprises:

providing a column of liquid (21) having a surface (20a) in contact with the inner volume (16) of the plenum (13);

providing a volume of liquid (21) communicating with the column of liquid (21) through at least one aperture (22, 24, 27), the volume of liquid (21) having a surface (20b) subjected to a pressure ("p"); and using the column of liquid (21) and the volume of liquid (21) to absorb and dissipate kinetic energy associated with oscillations generated in the plenum (13) of the compression system.

3. The method according to claim 2, further comprising providing a direct contact between the inner volume (16) of the plenum (13) and the surface (20a) of the column of liquid (21).

4. The method according to claim 2, further comprising placing a pressure de-intensifier device (28) between the inner volume (16) of the plenum (13) and the surface (20a) of the column of liquid (21).

5. The method according to claim 2, further comprising adjusting a gap of the at least one aperture (22, 24, 27) to vary the absorption conditions of the oscillations.

6. The method according to claim 2, wherein the compression system further comprises a generally U-shaped tube (19) having a first arm and a second arm connected to the first arm by a throttle (22) and the method further comprises:

containing the surface (20a) of the column of liquid (21) in the first arm; and containing the surface (20b) of the volume of liquid (21) in the second arm.

7. The method according to claim 2, further comprising using a first container (23) in communication with a second container (25) adjacent the first container (23), wherein the first container (23) is partly filled with the column of liquid (21) and the surface (20b) of the volume of liquid (21) is contained in the second container (25).

8. The method according to claim 2, further comprising using a first container (23) and a second container (25), wherein the first container (23) is partly filled with the column of liquid (21), the second container (25) is partly filled with the volume of liquid (21), and the first container (23) is partly immersed in the second container (25) and communicates therewith through the at least one aperture (27).

9. The method according to claim 8, further comprising varying the level of immersion ("y") of the first container (23) with respect to the second container (25) in order to vary attenuation and damping conditions achieved by the liquid (21) contained in the first container (23) and second container (25).

10. A passive surge control device for absorbing and dissipating kinetic energy associated with oscillations generated in a plenum (13) of a compression system having a compression element (11), the plenum (13) having an inner volume (16), the device comprising:

a column of liquid (21) having a surface (20a) in contact with the inner volume (16) of the plenum (13); and a volume of liquid (21) communicating with the column of liquid (21) through an aperture (22, 24, 27), the volume of liquid (21) having a surface (20b) subjected to a pressure ("p"), whereby the volume of liquid (21) and the column of liquid (21) absorb and dissipate the kinetic energy associated with the oscillations generated in the plenum (13).

11. The device according to claim 10, further comprising a pressure de-intensifier device (28) between the inner volume (16) of the plenum (13) and the surface (20a) of the column of liquid (21).

12. The device according to claim 10, wherein the aperture (22, 24, 27) has an adjustable gap.

13. The device according to claim 10, further comprising a generally U-shaped tube having a first arm and a second arm connected to the first arm by a throttle (22), wherein the surface (20a) of the column of liquid (21) is contained in the first arm and the surface (20b) of the volume of liquid (21) is contained in the second arm.

14. The device according to claim 10, further comprising a first container (23) in communication with a second container (25) adjacent the first container (23), wherein the first container (23) is partly filled with the column of liquid (21), and the surface (20b) of the volume of liquid (21) is contained in the second container (25).

15. The device according to claim 10, further comprising a first container (23) and a second container (25), the first container (23) including apertures (27) able to make an inner volume of the first container (23) communicate with an inner volume of the second container (25), wherein the first container (23) is at least partly filled with the column of liquid (21), the first container (23) is at least partly immersed, to a level of immersion ("y"), inside the second container (25), and the second container (25) is partly filled with the volume of liquid (21).

16. The device according to claim 15, wherein the apertures (27) have an adjustable gap.

17. The device according to claim 15, further comprising a conduit (26, 126) through which the inner volume (16) of the plenum (13) communicates with the inner volume of the first container (23), the conduit (26, 126) having a reduced section with respect to an area ("d") of the surface (20a) of the column of liquid (21).

18. The device according to claim 16, further comprising a conduit (26, 126) through which the inner volume (16) of the plenum (13) communicates with the inner volume of the first container (23), the conduit (26, 126) having a reduced section with respect to an area ("d") of the surface (20a) of the column of liquid (21).

19. The method according to claim 2, further comprising placing a pressure de-intensifier device (28) between the inner volume (16) of the plenum (13) and the surface (20b) of the volume of liquid (21).

20. The device according to claim 10, further comprising a pressure de-intensifier device (28) arranged between the inner volume (16) of the plenum (13) and the surface (20b) of the volume of liquid (21).

21. A passive surge control method for reducing oscillations associated with an instability of a compression system under particular operating conditions, the compression system comprising an elastic system based on a mass of liquid oscillating under a force of gravity and under a damping force of at least a damper device, the method comprising:

operating a compression system under the particular operating conditions associated that produce the oscillations associated with the instability; and transferring energy between the oscillations and the mass of liquid.

22. The method according to claim 21, wherein the oscillations have an oscillatory kinetic energy, the mass of liquid has a kinetic energy and a potential energy, and the transferring step further comprises:

transferring the oscillatory kinetic energy to the kinetic energy of the mass of liquid and to the potential energy of the mass of liquid;

dissipating the kinetic energy of the mass of liquid by applying to the mass of liquid the damping force; and applying the potential energy of the mass of liquid to the oscillations.

23. The method according to claim 22, wherein the compression system further comprises a compression element (12), a plenum (13) defined by at least an inner volume (16), the oscillations being generated in the plenum (13), the mass of liquid comprises a column of liquid and a volume of liquid in communication with the column of liquid through at least one aperture (22, 24, 27), the column of liquid having a surface (20a) in contact with the inner volume (16), the volume of liquid (21) having a surface (20b), and wherein the method further comprises:

applying a first pressure ("p") to the surface (20b); and producing a reduction in a second pressure between the inner volume (16) of the plenum (13) and the surface (20a) of the column of liquid (21).

* * * * *